UNITED STATES PATENT OFFICE.

GEORGE HARPST, OF NEW HAMBURG, PENNSYLVANIA.

IMPROVED COMPOSITION FOR WELDING.

Specification forming part of Letters Patent No. 50,355, dated October 10, 1865.

*To all whom it may concern:*

Be it known that I, GEORGE HARPST, of New Hamburg, in the county of Mercer and State of Pennsylvania, have invented a new and Improved Composition for Welding; and I do hereby declare that the following is a full, clear, and exact description thereof, which will enable others skilled in the art to fully understand and make use of the same.

This invention relates to a composition which can be used with great advantage for welding iron and steel, or steel and steel, or iron and iron together, though it is used particularly for welding steel to iron. It can also be used to aid the operation of uniting copper and brass or other metals.

My composition is made of sal-ammoniac and refined borax, and these ingredients are mixed together in about the following proportion: refined borax, three-fourths pound; sal-ammoniac, one-fourth pound. I mix the ingredients and place them together into a sheet-iron pan over a hot blacksmith's fire and heat the same to a bright-red heat. The higher the heat the better the flux. When highly heated the mixture becomes black, and in this state I apply it, particularly for welding iron and steel together. When less highly heated the color of the mixture remains lighter, and in this state I use it for more common work, or in the operation of uniting other metals, such as copper and brass.

By the application of my composition iron and steel are effectually prevented from burning, and I have succeeded to weld the spring of a clock together by using my composition. The effect thereof is much superior to that of borax alone, and it can be used with great advantage in all operations for uniting two pieces of metal.

I claim as new and desire to secure by Letters Patent—

The within-described composition, made substantially as set forth, for the purpose specified.

GEORGE HARPST.

Witnesses:
  JOSHUA HOMMAR,
  G. E. CARNS.